Oct. 24, 1939.  E. A. STALKER  2,177,159
PUMPING MACHINERY
Filed March 11, 1938  2 Sheets-Sheet 1
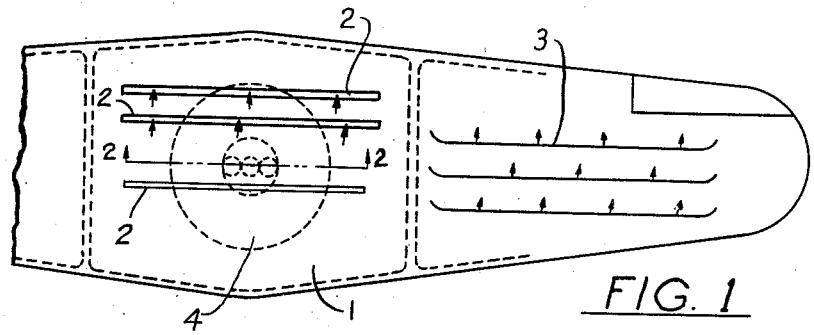
FIG. 1
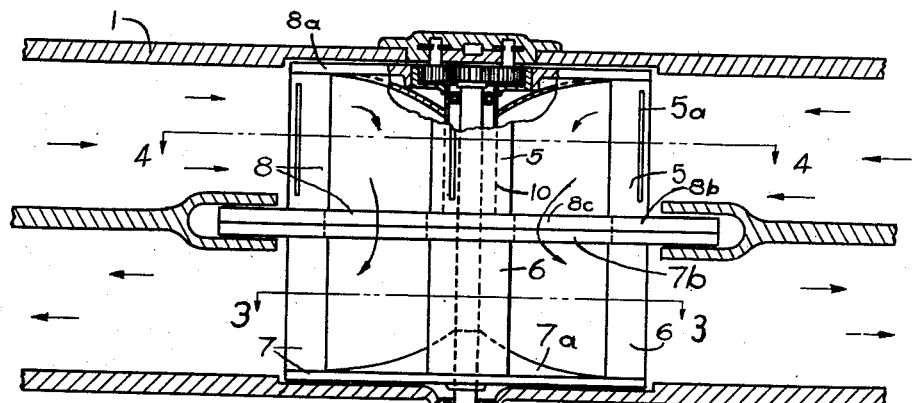
FIG. 2
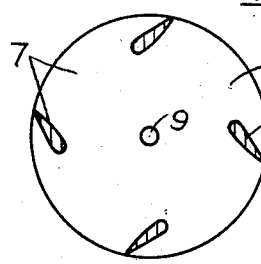
FIG. 3
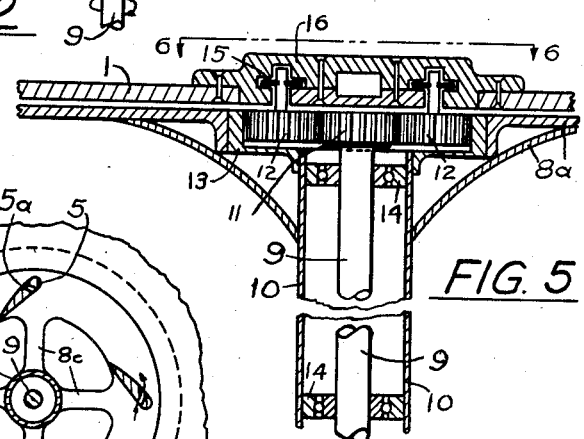
FIG. 4
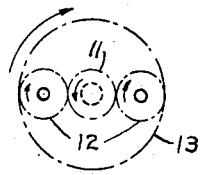
FIG. 6
FIG. 5
INVENTOR
Edward A. Stalker Oct. 24, 1939.   E. A. STALKER   2,177,159
PUMPING MACHINERY
Filed March 11, 1938   2 Sheets-Sheet 2

INVENTOR
Edward A. Stalker

Patented Oct. 24, 1939

2,177,159

UNITED STATES PATENT OFFICE 2,177,159

PUMPING MACHINERY

Edward A. Stalker, Ann Arbor, Mich.

Application March 11, 1938, Serial No. 195,306

3 Claims. (Cl. 230—45)

My invention relates to pumping machinery and has for its objects: first, to provide a compact pumping means for use in an aircraft; second, to provide a multi-stage blower of great compactness; and third, to provide an efficient single stage pumping means.

I attain these objects by means illustrated in the accompanying drawings in which—

Figure 1 is a plan view of a wing containing the pump;

Figure 2 is a fragmentary vertical section of the wing and pump taken along the line 2—2 in Figure 1;

Figure 3 is a horizontal section taken along line 3—3 in Figure 2;

Figure 4 is a horizontal section taken along line 4—4 in Figure 2;

Figure 5 is a fragmentary vertical section along the axis of the pump shaft, that is, along line 2—2 in Figure 1;

Figure 6 is a fragmentary plan view of the gear mechanism as indicated by the line 6—6 in Figure 5;

Figure 7:
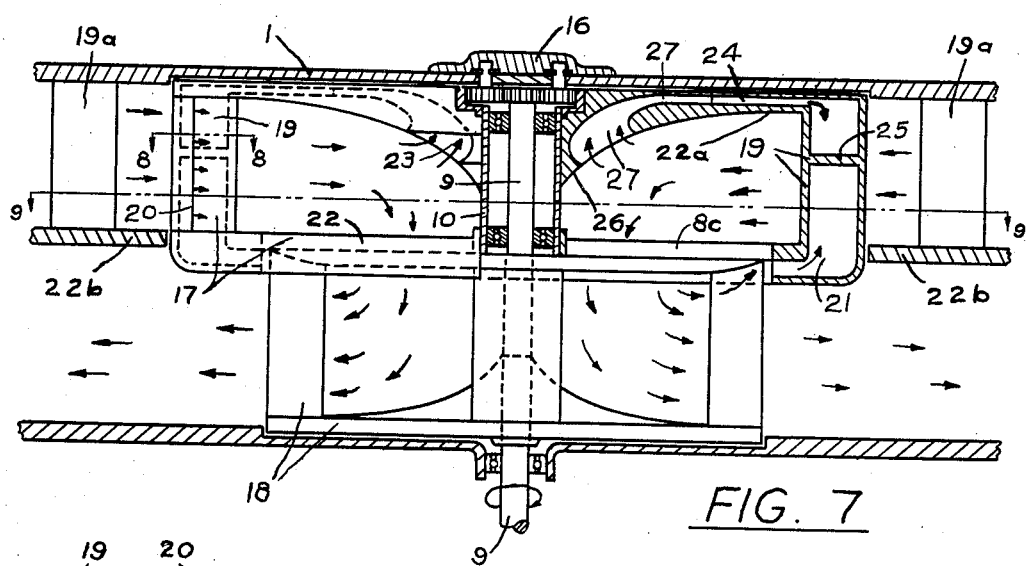
Figure 7 is a vertical elevation partly in section of the preferred form of the invention.

In aircraft in particular it is important to have a compact pumping unit since space within the aircraft is necessarily restricted. This is especially true of the wings which are a desirable location for the pumping machinery to energize the boundary layer on the wing. The use of a blower for this purpose has been described in my Patent No. 1,913,644 granted June 13, 1933.

Using a blower, energization of the boundary layer consists essentially of causing a flow of air through slots in the wing surface. It is desirable that this flow be inward through certain slots and outward through others so that it becomes difficult to have passages for the flow of air to and from the pump or blower in the same instance a blower which occupies the maximum depth of the wing. This can be accomplished with a blower taking air in radially and discharging it radially.

In Figure 1 the wing is 1 and the inlet slots are 2, while the discharge slots are 3.

The blower 4 shown in Figure 1 is best shown in Figures 2 to 5. The blades of the blower are arranged in two stages, those of the first stage being 5, and those of the second, 6. The first stage has a flow inward toward the axis as indicated by the arrows in Figure 2. The second stage has a flow outward from the axis.

For reasons which will be explained subsequently, the impeller 7 composed of the blades 6 is arranged to be turned at a greater rate of speed than impeller 8 composed of blades 5.

Impeller 7 is composed of the plate 7a, annular member 7b (see Figures 2 and 3), the blades 6 and the shaft 9 which extends upward to the top of the blower. The shaft is fixed to the member 7a.

Impeller 8 is composed of the plate 8a, annular member 8b and the hollow shaft 10 fixed to the member 8b. See also Figures 4 and 5.

The annular member 8b is preferably attached to shaft 10 by an airscrew 8c. That is, the radial members of 8c are blades having a pitch to induce a flow downward from impeller 8 to impeller 7.

The blower is driven by the shaft 9 through gear mechanism illustrated in Figure 5. The gear 11 meshes with the two gears 12 rotatably mounted in the upper wall of the wing 1. The gears 12 mesh with the internal spur gear 13 fixed on the hollow shaft 10.

The shaft 9 is borne in the hollow shaft 10 by the ball bearings 14.

The gears 12 have thrust collars to position them. The housing 16 which is removable from the top of the wing facilitates the assembly of the gears 12 and their collars.

The shaft 9 is fixed to the annular member 7a and so the turning of this shaft turns the impeller 7 at a like speed. But the shaft 10 and its impeller 8 turn at a slower speed because of the speed reduction effected through the gears 11, 12 and 13. Thus, the impeller 8 turns at a slower speed than the impeller 7.

The impeller 7 has blades 6 of conventional airfoil form as indicated in Figure 3. The impeller 8 has blades of slotted form as shown in Figure 4.

The slot is 5a and extends from the under or pressure side to the upper or suction side of the blade so that fluid flows through the slot. In cross section the slot is of nozzle-like form and arranged to direct a jet of fluid along the upper surface toward the trailing edge.

The function of the slot is well known in the science of aeronautics and so it will be described only briefly here.

A wing creates a force transverse to the relative wind of a magnitude depending on the angle the wing makes with the wind. For a conventional wing the maximum angle is about 20 degrees, and the value of the lift coefficient is of the order of 1.6. This coefficient is defined as follows:

$$\text{Lift} = C_L A \frac{\rho V^2}{2}$$

Where $C_L$ is the lift coefficient, $\rho$ (rho) is the mass density of the fluid, $A$ is the blade area, and $V$ is the speed of the wing relative to the fluid. It is desirable to speak in terms of the lift coefficient because the former is independent of the speed, density and size of the wing, and is directly proportional to the lift. The reason the lift coefficient reaches a maximum at a relatively small value is that the flow over the upper surface of the wing fails to follow this surface and thus to be deflected downward by it. It is well known that a slot such as $5a$ prevents the separation of the flow and makes possible large angles of the wing relative to the fluid and large values of the lift coefficient, several times higher than available from the unslotted wing.

The function of the slotted wing in the blower is to make effective an impelling means of forcing fluid inward toward the axis of rotation. When impeller 8 is rotated, the blades by their airfoil action force fluid toward the axis of rotation, but there is an opposing force arising from the centrifugal force because some rotation is given to the air. For the impeller 8 to operate efficiently then, the centrifugal force must be low compared to the force imposed by the action of the lift force from the wing. It is for this reason that the runner 8 is operated at a slow speed and is provided with high lift capacity blades to create sufficient pressure on the pumped fluid.

That is, a suitable inward pressure can be created on the pumped fluid by the employment of high lift capacity blades because they furnish sufficient pressure creating ability to compensate for the slow speed required by the need of keeping the centrifugal pressure low.

The blower thus draws fluid inward in the first stages, that is, through impeller 8 and delivers fluid axially into the second stage where it is blown outward by the blades 6 or impeller 7.

It is not necessary that the blade slot be served with fluid from the under side of the wing. Any other method of supplying fluid to the upper surface slot can be employed.

Figure 8:
Figure 8 is a cross section of an impeller blade taken along 8—8 in Figure 7.
Figure 9:
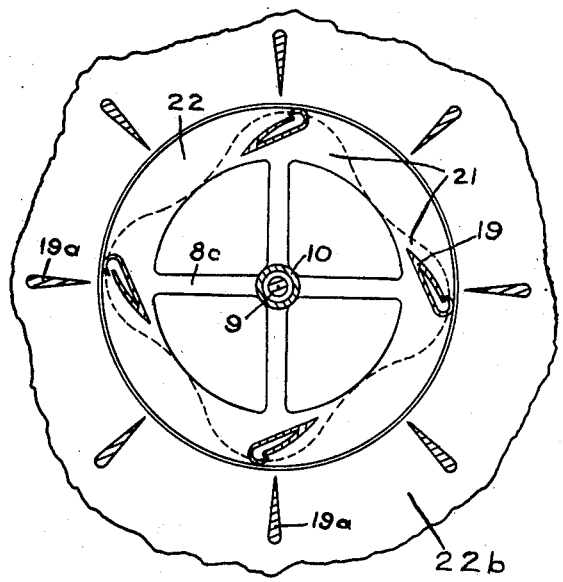
Figure 9 is a fragmentary sectional view along the line 9—9 of Figure 7 of the upper impeller.

In Figure 7 another form and means of boundary layer energization is illustrated as embodied in the impellers 17 and 18. The upper surfaces of the blades 19 of impeller 17 are slotted and the blades are hollow. See Figure 8. The hollow interiors communicate exteriorly of the impeller 17 by means of the duct 21 which is open at the end facing the impeller 18. It will be readily apparent that fluid blown by the latter impeller will enter the blades 19 and will flow out the slots 20. This flow will energize the boundary layer on the blades and permit them to be operated at a very high lift coefficient. The ducts 21 are also shown in Figure 9.

The mode of rotating the two impellers is the same as that described in conjunction with Figures 2 to 6 and hence need not be repeated.

Figure 10:
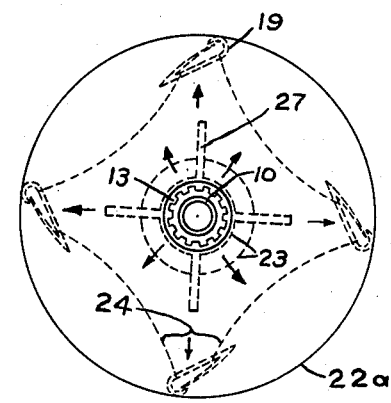
Figure 10 is a plan view of the impeller plate 22a showing the internal passage.
Figure 11:
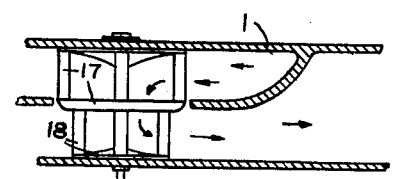
Figure 11 is a fragmentary view of the wing along line 7—7 to show the relation of the blower to the walls of the wing and its compartments. It is similar to Figure 7 except that more of the wing walls are shown.

The blades 19 are also supplied with air for their slots by means of the opening 23 and passage 24 in the upper plate 22a. The passage 24 is shown in Figure 10 also and it will be noted that the flow therein is directed to the blades 19.

The fluid entering the opening 23 is under pressure from the flow curvature caused by the curved hub member 26. The plate 22a and the guide vanes 27 in the passage 24 force the fluid into the interior of the blade by centrifugal force. The blade is divided chordwise by the partition 25 so that the lower portion of the slot 20 is served by the duct 21, and the upper by the inlet 23.

The vanes 19a guide the flow to the impeller and prevent it from assuming a rotary component of velocity.

While I have illustrated specific forms of the invention, I wish it to be understood that I intend to claim my invention broadly as defined by the scope of the appended claims.

I claim:

1. In combination to form a multi-stage blower, an impeller having a blade whose upper surface has a slot therein for the passage of fluid to energize the boundary layer on the surface, said blade being adapted for movement along a curved path and being disposed with an angle of attack relative to said curved path so as to impell a flow radially inward toward the center of curvature, means to induce a flow through the slot to energize the boundary layer on the blade, a second impeller having a blade adapted for movements along a curved path and for discharge of fluid radially outward, means to deliver the flow of the first impeller to the second impeller for discharge radially outward, and means to rotate the impellers at different speeds.

2. In combination, a hollow blade immersed in a fluid, means to rotate said blade about a center, the blade having its leading edge further than the trailing edge from the said center so as to press inward on the fluid, and means to insure a radially inward pressure in opposition to the centrifugal pressure arising from the rotary motion imparted to the fluid by the blade comprising means to cause a fluid flow through the upper surface of said blade for energizing the boundary layer, so that the blade may be operated at a large enough angle of attack to create a pressure greater than the centrifugal pressure.

3. In combination to form a multi-stage blower, an impeller having a blade whose upper surface has a slot therein for the passage of fluid to energize the boundary layer on the surface, said blade being adapted for movement along a curved path and being disposed with an angle of attack relative to said curved path so as to impel a flow radially inward toward the center of curvature of the path, means to induce a flow through the slot to energize the boundary layer on the blade, a second impeller having a blade adapted for movement along a curved path and for discharge of fluid radially outward, said two impellers being in communication for the interchange of fluid, and means to rotate the impellers.

EDWARD A. STALKER.